(12) United States Patent
Srinivasan et al.

(10) Patent No.: US 10,915,577 B2
(45) Date of Patent: Feb. 9, 2021

(54) CONSTRUCTING ENTERPRISE-SPECIFIC KNOWLEDGE GRAPHS

(71) Applicant: ADOBE INC., San Jose, CA (US)

(72) Inventors: Balaji Vasan Srinivasan, Bangalore (IN); Rajat Chaturvedi, Ahmedabad (IN); Tanya Goyal, Mumbai (IN); Paridhi Maheshwari, Bhopal (IN); Anish Valliyath Monsy, Coimbatore (IN); Abhilasha Sancheti, Bangalore (IN)

(73) Assignee: ADOBE INC., San Jose, CA (US)

(*) Notice: Subject to any disclaimer, the term of this patent is extended or adjusted under 35 U.S.C. 154(b) by 227 days.

(21) Appl. No.: 15/928,288

(22) Filed: Mar. 22, 2018

(65) Prior Publication Data

US 2019/0294732 A1    Sep. 26, 2019

(51) Int. Cl.
*G06F 16/907* (2019.01)
*G06F 16/901* (2019.01)
*G06F 16/81* (2019.01)

(52) U.S. Cl.
CPC .......... *G06F 16/9024* (2019.01); *G06F 16/81* (2019.01); *G06F 16/907* (2019.01)

(58) Field of Classification Search
None
See application file for complete search history.

(56) References Cited

FOREIGN PATENT DOCUMENTS

WO    WO-2005020091 A1 *   3/2005   ............ G06F 16/951

OTHER PUBLICATIONS

Gunaratna, Kalpa. Apr. 2017, Semantics-based Summarization of Entities in Knowledge Graphs.*

* cited by examiner

*Primary Examiner* — Tuankhanh D Phan
(74) *Attorney, Agent, or Firm* — Shook, Hardy & Bacon LLP (57) ABSTRACT

A framework is provided for constructing enterprise-specific knowledge bases from enterprise-specific data that includes structured and unstructured data. Relationships between entities that match known relationships are identified for each of a plurality of tuples included in the structured data. Where possible, relationships between entities that match known relationships also are identified for tuples included in the unstructured data. If matching relationships between entities that cannot be identified for tuples in the unstructured data, extracted relationships are sequentially clustered to similar relationships and a relationship is assigned to the clustered tuples. An enterprise-specific knowledge graph is constructed from the structured-data-tuples and their identified relationships, the unstructured-data-tuples where the relationships could be mapped to a known relationship and their identified relationships, and the unstructured-data-tuples that could not be mapped to a known relationship and their assigned relationships. The knowledge graph is enriched with any information determined to be missing therefrom.

20 Claims, 7 Drawing Sheets

FIG. 2

STRUCTURED TEXT
```
category:    back-to-school
rating:      99
author:      tlau
FinalPrice:  $25.99
Discount:    $24.00
store:       Amazon,
date:        2015-01-17 21:05:00
id:          62392
ListPrice:   $49.99
title:       Logitech K480 Bluetooth Wireless Multi-Device Keyboard
```

UNSTRUCTURED TEXT description: Amazon has the Logitech K480 Bluetooth Wireless Multi-Device Keyboard for a low $25.99 Free Shipping. This Logitech keyboard normally retails for $50, so you're saving 48% off with this deal. Over 1,600 reviews on Amazon with 4.2/5 star rating81 keys with internet keys and volume control panel Wireless keyboard for PC, Mac, Chrome, smartphones and tablets.

CONSTRUCTING ENTERPRISE-SPECIFIC KNOWLEDGE GRAPHS

BACKGROUND

Organizing and structuring online information is an important and challenging task as it greatly facilitates information retrieval and question-answering. Given its importance, the number of large-scale, publicly available knowledge bases has significantly increased in recent years. Examples include, without limitation, GOOGLE Knowledge Graph, YAGO knowledge base, and DBpedia. Most readily available, large-scale knowledge bases are built on top of a combination of structured data (i.e., data residing in a fixed field in a document, file, or record, such as information boxes, tables, and the like) and unstructured data (i.e., data that either does not have a pre-defined data model or is not organized in a pre-defined manner).

While the success of such knowledge bases alone attests to their usefulness, most existing knowledge bases are built utilizing a generic corpus of data. Accordingly, the information present in such knowledge bases often cannot be extended to the needs of a specific domain or enterprise. For example, such knowledge bases generally prove to be of little use in retrieving information for enterprise customers such as e.g., WebMD®, because, at least in part, the data required to cater to the enterprise knowledge organization are not available in the generic sources. Further, the type of data that is available within a particular enterprise or domain varies with regard to quality.

SUMMARY

Embodiments of the present invention relate to, among other things, a framework for constructing enterprise-specific knowledge graphs. Enterprise-specific data is received that includes both structured and unstructured data. Structured data is data that resides in a fixed field in a document, file, or record, such as an information box, a table, or the like. Structured data, in the form of text-field/value pairs, naturally occurs as a plurality of tuples or triples having a <subject><predicate><object> format. Each distinct text-field represents an edge between the entities (referred to by the <subject> and <object> elements) and the corresponding text-field values. Relationships (referred to by the <predicate> elements) between the entities of the structured data are identified through comparison to a predefined relationship taxonomy.

Unstructured data is data that either does not have a pre-defined data model or is not organized in a pre-defined manner. Exemplary unstructured data is free text such as alpha-numeric text presented in a sentence format or the like. In embodiments, tuples (or triples) of the <subject><predicate><object> format are extracted from the unstructured data. The entities (referred to by the <subject> and <object> elements) and relationships (referred to by the <predicate> objects) are canonicalized to standardize the tuples to predefined taxonomies. Entity canonicalization maps the entities to a predefined entity taxonomy that includes entity categories (e.g., persons, locations, etc.). Where possible, relationship canonicalization maps relationships to a predefined relationship taxonomy. Relationships that cannot be mapped to the predefined relationship taxonomy are canonicalized via sequential clustering to group similar relationships together and a relationship is assigned to the clustered tuples.

An enterprise-specific knowledge graph is constructed from the structured-data-tuples and their respective identified relationships, the unstructured-data-tuples for which the relationships could be mapped to a predefined relationship taxonomy and their respective identified relationships, and the unstructured-data-tuples that could not be mapped to the predefined relationship taxonomy and their respective assigned relationships. The enterprise-specific knowledge graph is enriched with any information determined to be missing from the enterprise-specific knowledge graph based upon a probabilistic approach.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Certain embodiments or implementations of the present disclosure are illustrated by way of example and not limitation in the accompanying figures in which like reference numerals indicate similar elements and in which.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied when one or more features are present. Also, the term "or" includes the conjunctive, the disjunctive and both (a or b thus includes either a or b, as well as a and b).

As previously set forth, organizing and structuring online information is an important and challenging task as it greatly facilitates information retrieval and question-answering. Given its importance, the number of large-scale, publicly available knowledge bases has significantly increased in recent years. Examples include, without limitation, GOOGLE Knowledge Graph, YAGO knowledge base, and DBpedia. Most readily available, large-scale knowledge bases are built on top of a combination of structured data (i.e., data residing in a fixed field in a document, file, or record, such as information boxes, tables, and the like) and unstructured data (i.e., data that either does not have a pre-defined data model or is not organized in a pre-defined manner, such as free text).

The success of such knowledge bases alone attests to their usefulness. While generally not constructed for particular domains or verticals, even in an enterprise setting, knowledge graphs can be useful in fetching relevant results or answering questions that require knowledge from more than one source/document. For instance, a query such as: "Which mobile phones from Samsung have dual sim?" can be addressed by simultaneously looking at all facts around "mobile phones from Samsung" and "mobile phones with dual sim."

Most existing knowledge bases have significant limitations when considering enterprise-specific domains. First of all, most existing knowledge bases are built utilizing a generic corpus of data. Accordingly, the information present in such knowledge bases often cannot be extended to the needs of a specific domain or enterprise, at least partially because the data required to cater to the enterprise knowledge organization are not available in the generic sources. Further, the type of data that is available within a particular enterprise or domain varies with regard to quality. Thus, the limited data availability and non-standardized nature of the data that is available makes extracting meaningful facts from the mixture of structured and unstructured data particularly challenging in an enterprise setting.

Linking various entities across documents/sources to provide a more holistic view also is challenging in an enterprise setting. This involves utilizing ontological constraints and entity disambiguation to identify the multiple representations of the same entities in different places/context. Absence of a standard ontology for the enterprise setting makes this even more challenging as multiple representations of the facts in the extracted knowledge are to be accounted for and such multiple representations are to be de-duplicated to achieve an accurate knowledge representation.

Enriching enterprise-specific knowledge graphs by inferring additional relationships from the existing facts is also particularly challenging due to the limited amount of data in the enterprise setting. Thus, it is important to learn the relationships from existing data to infer new facts and thus enrich the knowledge graph with information that is not explicitly present in the dataset.

As mentioned previously, knowledge bases like GOOGLE Knowledge Graph, YAGO knowledge base, and DBpedia have been built by processing data in the public domain. These knowledge bases extract meaningful relationships and construct tuples (triples) of the format <entity, relationship, entity>. Each of these triples constitutes a fact. However, all these knowledge bases cover a broad range of real world concepts and are not restricted to any domain.

Building knowledge bases for a specific vertical/enterprise requires a fundamentally different procedure. Unlike the facts extracted from a large corpus like WIKIPEDIA, facts from a much smaller enterprise data corpus tends to be noisy and calls for a mechanism to filter out relevant and irrelevant information. A standard taxonomy cannot be entirely used to categorize the relationships in a domain specific ontology since these relationships in the facts change with the specific vertical/enterprise. Further, the taxonomies derived from standard sources, like DBpedia, have been manually curated and it is infeasible to do so for each separate domain or enterprise.

Given a repository of content, with structured and unstructured data, implementations of the present disclosure provide methods for pruning facts from the content by processing all possible tuples (triples) in the data accounting for ontological constraints. Each processed fact is represented as a tuple having a <subject><predicate><object> (or <entity><relationship><entity>) format. Further pruning is performed by linking entities within and across documents by mapping the tuples to standard taxonomies. This provides a holistic view of all facts pertaining to a single entity, from content derived from multiple enterprise-specific sources/documents.

Implementations of the present disclosure further provide mechanisms to identify and cluster semantically similar relationships that are expressed differently in the data. This is done through a combination of semantic and syntactic pairing for relationships that cannot be mapped to a pre-defined relationship taxonomy. Implementations further provide an approach to enrich the facts by probabilistically inferring new facts from the previously extracted facts.

Accordingly, an exemplary aspect of the invention is directed to a computer-implemented method for constructing an enterprise-specific knowledge graph. The method includes receiving enterprise data from at least one enterprise-specific source. A first portion of the enterprise data is structured data and a second portion of the enterprise data is unstructured data. The structured data includes a plurality of text fields, each text field having a corresponding value such that the structured data includes a first plurality of text-field/value pairs. The method further includes identifying a relationship corresponding to each text-field/value pair of the first plurality of text-field/value pairs that matches one of a plurality of predefined relationships included in a predefined relationship taxonomy. Still further, the method includes extracting a second plurality of text-field/value pairs from the unstructured data and determining that each text-field/value pair of a first portion of the second plurality of text-field/value pairs refers to a relationship that matches one of the plurality of predefined relationships included in the predefined relationship taxonomy and each text-field/value pair of a second portion of the second plurality of text-field/value pairs refers to a relationship that does not match one of the plurality of predefined relationships. The method further includes identifying one of the plurality of predefined relationships included in the predefined relationship taxonomy that matches each text-field/value pair of the first portion of the second plurality of text-field/value pairs. Still further, the method includes sequentially clustering the relationships referenced by the second portion of the second plurality of text-field/value pairs such that similar relationships are grouped together and attributing an assigned relationship to at least part of the text-field/value pairs of the second plurality of text-field/value pairs based upon the sequential clustering. Still further the method includes constructing the enterprise-specific knowledge graph from, at least in part, the first plurality of text-field/value pairs and their respective identified relationships, the first portion of the second plurality of text-field/value pairs and their respective relationships, and the part of the second portion of the second plurality of text-field/value pairs and their respective assigned relationships. In embodiments, the method can further include enriching the enterprise-specific knowledge graph by adding a third plurality of text-field/value pairs that is determined to be missing based upon prior known, existing patterns.

Another exemplary embodiments is directed to one or more computer storage media storing computer-useable instructions that, when executed by one or more processors, cause the one or more processors to perform a method for constructing an enterprise-specific knowledge graph. The method includes receiving enterprise data from an enterprise knowledge repository, a first portion of the enterprise data being structured data and a second portion of the enterprise data being unstructured data. The structured data contains a first plurality tuples, each structured-data-tuple including a structured-data-tuple <subject> element, a structured-data-tuple <predicate> element, and a structured-data-tuple <object> element arranged in a <subject><predicate><object> format. The method further includes identifying a relationship corresponding to each of the plurality of structured-data-tuples that matches one of a plurality of predefined relationships included in a predefined relationship taxonomy. Still further, the method includes extracting a second plurality of tuples from the unstructured data, each of the unstructured-data-tuples including an unstructured-data-tuple <subject> element, an unstructured-data-tuple <predicate> element, and an unstructured-data-tuple <object> element arranged in the <subject><predicate><object> format. Further still, the method includes determining that each unstructured-data-tuple of a first portion of the second plurality of tuples refers to a relationship that matches one of the plurality of predefined relationships included in the predefined relationship taxonomy and each unstructured-data-tuple of a second portion of the second plurality of tuples refers to a relationship that does not match one of the plurality of predefined relationships included in the predefined relationship taxonomy. Additionally, the method includes identifying one of the plurality of predefined relationships included in the predefined relationship taxonomy that matches each unstructured-data-tuple of the first portion of the second plurality of tuples. The method additionally includes sequentially clustering the relationships referenced by the second portion of the second plurality of tuples such that similar relationships are grouped together and attributing an assigned relationship to at least part of the unstructured-data-tuples of the second plurality of tuples based upon the sequential clustering. The method further includes constructing the enterprise-specific knowledge graph from, at least in part, the structured-data-tuples of the first plurality of tuples and their respective identified relationships, the unstructured-data-tuples of the first portion of the second plurality of tuples and their respective identified relationships, and at least part of the unstructured-data-tuples of the second portion of the second plurality of tuples and their respective assigned relationships. Further, the method includes enriching the enterprise-specific knowledge graph by adding a third plurality of tuples that is determined to be missing from the enterprise-specific knowledge graph based upon existing patterns.

Yet another exemplary embodiment is directed to a computer system comprising one or more processors and one or more computer storage media storing computer-useable instructions that, when used by the one or more processors, cause the one or more processors to perform specific functions. The functions may include, without limitation, (a) receiving enterprise data from at least one source having enterprise-specific information associated therewith, a first portion of the received enterprise data being structured data and a second portion of the received enterprise data being unstructured data, the structured data having a first plurality of text fields, each text field of the first plurality of text fields corresponding to a structured-data-tuple; (b) canonicalizing the structured data by: (1) identifying a relationship corresponding to each structured-data-tuple and (2) mapping the relationship to a relationship included in a predefined relationship taxonomy; (c) canonicalizing the unstructured data by: (3) extracting a plurality of unstructured-data-tuples from the unstructured data, each of the plurality of unstructured-data-tuples having a <subject> element, a <predicate> element and an <object> element, the <subject> and <object> elements representing entities and the <predicate> element representing a correlation between the <subject> and <object> elements; (4) mapping the <subject> and <object> elements of each unstructured-data-tuple to entity categories included in a predefined entity taxonomy; (5) determining a first portion of the <predicate> elements that can be mapped to the predefined relationship taxonomy and a second portion of the <predicate> element that cannot be mapped to the predefined relationship taxonomy; (6) mapping each <predicate> element of the first portion of the <predicate> elements to a relationship included in the predefined relationship taxonomy; (7) sequentially clustering the second portion of the <predicate> elements to group similar <predicate> elements together; and (8) attributing an assigned relationship to at least part of the second portion of the <predicate> elements based on the sequential clustering; and (d) construct an enterprise-specific knowledge graph from, at least in part, the structured-data-tuples and their respective identified relationships, the unstructured-data-tuples containing the first portion of the <predicate> elements and their respective identified relationships, and at least a portion of the unstructured-data-tuples containing the second portion of the <predicate> elements and their respective assigned relationships.

Figure 1:
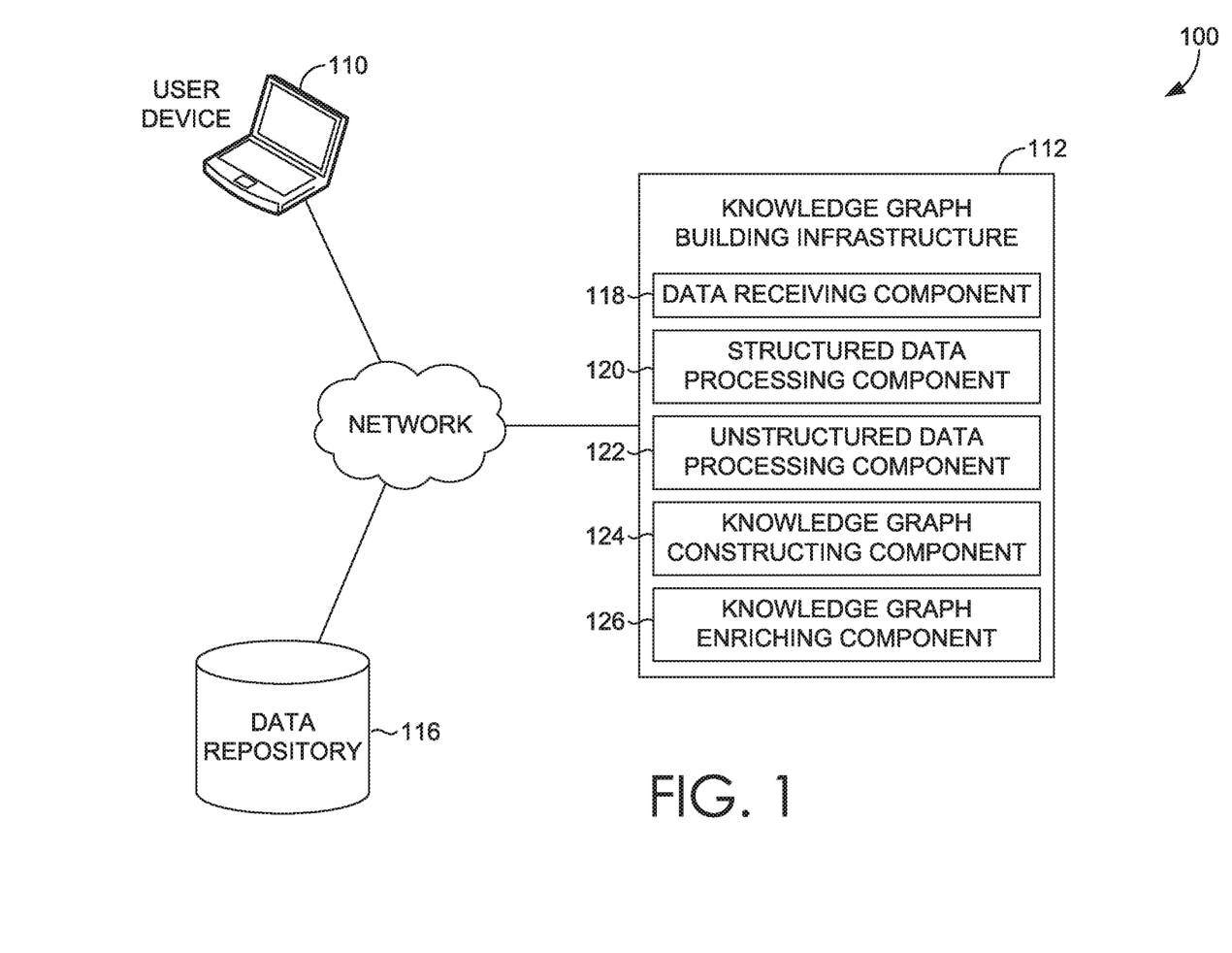
FIG. 1 is a block diagram of an exemplary computing system in which some implementations of the present disclosure may be employed.

With reference now to the drawings, FIG. 1 is a block diagram illustrating an exemplary system 100 for constructing an enterprise-specific knowledge graph in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 110 interacting with a knowledge graph building infrastructure 112 to construct enterprise-specific knowledge graphs from enterprise-specific data. Each of the components shown in FIG. 1 can be provided on one or more computer devices, such as the computing device 700 of FIG. 7, discussed below. It should be noted that implementations of the present disclosure are equally applicable to mobile computing devices and devices accepting gesture, touch and/or voice input. Any and all such variations, and any combination thereof, are contemplated to be within the scope of implementations of the present disclosure.

As shown in FIG. 1, the user device 110 and the knowledge graph building infrastructure 112 can communicate via the network 114, which may include, without limitation, one or more local area networks (LANs) and/or wide area networks (WANs). Such networking environments are commonplace in offices, enterprise-wide computer networks, intranets, and the Internet. Accordingly, the network 114 is not further described herein. It should be understood that any number of user devices and knowledge graph building infrastructures may be employed within the system 100 within the scope of implementations of the present disclosure. Each may comprise a single device or multiple devices cooperating in a distributed environment. For instance, the knowledge graph building infrastructure 112 could be provided by multiple server devices collectively providing the functionality of the knowledge graph building infrastructure 112 as described herein. Additionally, other components not shown may also be included within the network environment.

The knowledge graph building infrastructure 112 has access to at least one data source or repository 116 that includes enterprise-specific data. In implementations of the present disclosure, the data repository 116 is configured to be searchable for one or more of the items stored in association therewith. It should be understood that the information stored in association with the data repository 116 may be configurable and may include any information relevant to, by way of example only, data generated by and/or pertaining to a particular enterprise or domain. The content and volume of such information are not intended to limit the scope of aspects of the present technology in any way. Further, the data repository 116 may be a single, independent component (as shown) or a plurality of storage devices, for instance, a database cluster, portions of which may reside in association with the knowledge graph building infrastructure 112, another external computing device (not shown), and/or any combination thereof. Additionally, the data repository 116 may include a plurality of unrelated data repositories or sources within the scope of embodiments of the present technology.

The knowledge graph building infrastructure is generally configured to receive enterprise-specific data from a data repository, such as the data repository 116, and construct an enterprise-specific knowledge graph from the received data. Instruction to construct or modify an enterprise-specific knowledge graph may be received from the user device 110 which can access and communicate with the knowledge graph building infrastructure 112 via a web browser or other application running on the user device 110. The knowledge graph building infrastructure 112 includes a data receiving component 118, a structured data processing component 120, an unstructured data processing component 122, a knowledge graph constructing component 124, and a knowledge graph enriching component 126.

The data receiving component 118 is configured to receive enterprise-specific data (for instance, from the data repository 116) as a mixture of structured data (i.e., data residing in a fixed field in a document, file, or record, such as information boxes, tables, and the like) and unstructured data (i.e., data that either does not have a pre-defined data model or is not organized in a pre-defined manner). Structured data, in the form of text-field/value pairs, naturally occurs in tuples having an <entity><relationship><entity> format and, more specifically, a <subject><predicate><object> format. Each distinct field represents an edge between the entities (referred to by the <subject> and <object> elements) and the corresponding text-field value.

Figure 2:
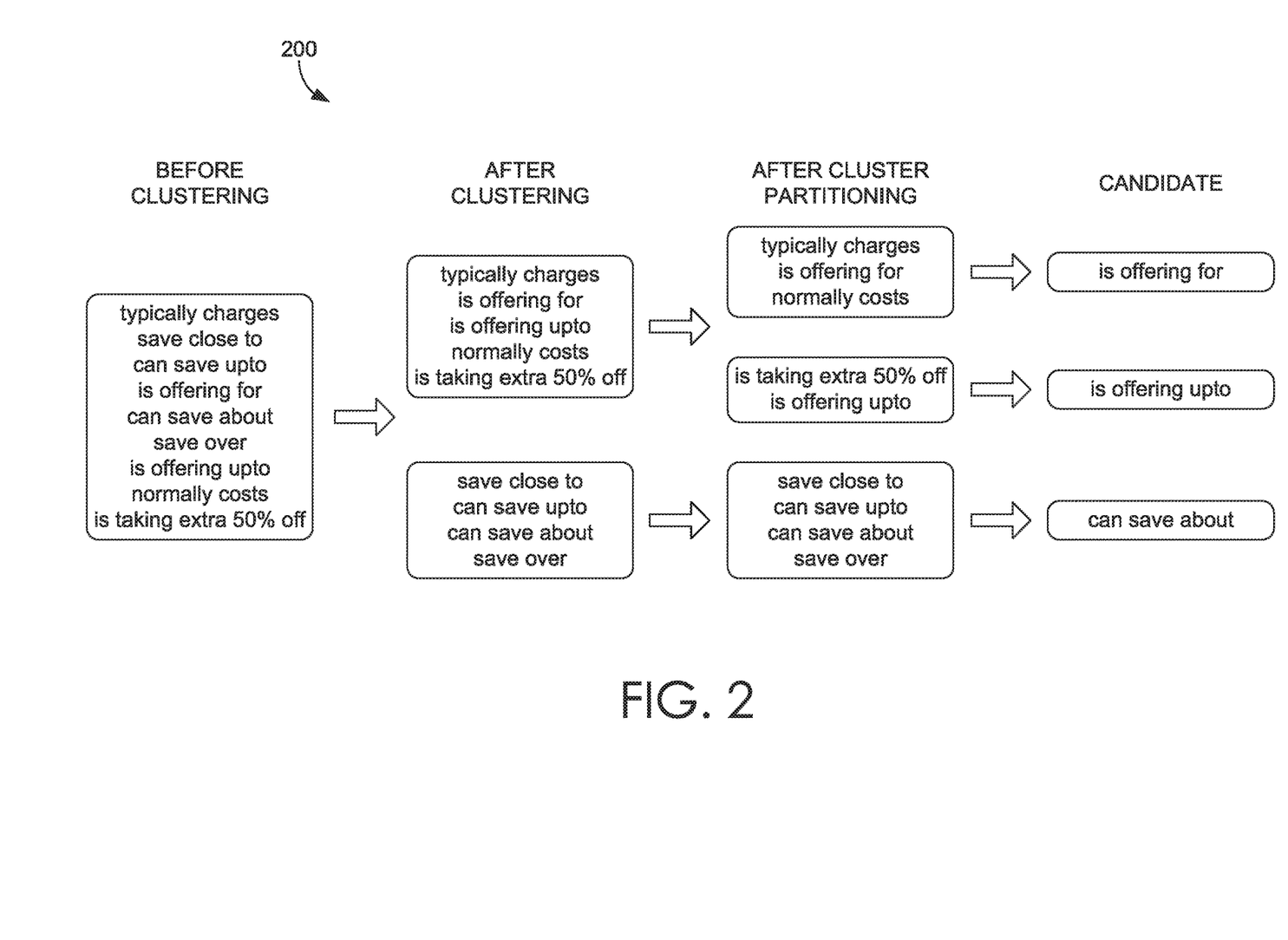
FIG. 2 is a schematic diagram illustrating exemplary enterprise-specific data that may be utilized in some implementations of the present disclosure.

The structured data processing component 120 is configured to identify a relationship corresponding to each text-field/value pair contained in the structured data. Such relationships corresponding to the text-field/value pairs can be identified via comparison of the <predicate> or <relationship> element of each tuple to relationships that occur in one or more known relationship taxonomies (e.g., the YAGO relationship taxonomy). By way of example only, and with reference to FIG. 2, from the structured text field 'author,' the tuple <product62392><isWrittenBy><tlau> may be extracted. The text-field maps to the relationship of the <predicate> element 'isWrittenBy,' which is further mapped to a predefined, known relationship taxonomy. In embodiments, this canonicalization of text-fields to relationships from predefined, known relationship taxonomies may take place in a non-automated manner.

As more fully described below with respect to the knowledge graph constructing component 124, tuples extracted from the structured data, and the respective relationships identified and matched to a predefined, known relationship taxonomy may be utilized to begin to construct an enterprise-specific knowledge graph.

The unstructured data processing component 122 is configured to process the unstructured data into tuples having associated relationships. Initially, the unstructured data can be pre-processed to resolve any co-referencing pronouns using a co-reference parser. Various co-reference parsers are known to those having ordinary skill in the relevant art and, accordingly, are not further described herein. From the pre-processed text, tuples having the <subject><predicate><object> format are extracted based on an open IE architecture (known to those having ordinary skill in the relevant art) which identifies relationship phrases in unstructured text based on syntactic and lexical constraints and assigns a pair of noun arguments for each extracted relationship (based upon the <predicate> element of the extracted tuples). For each tuple, the entity type of <subject> and <object> are recognized, for instance, utilizing the Stanford Named Entity Recognizer (known to those having ordinary skill in the art).

As tuple extraction is heavily based on the structure (or lack thereof) of the unstructured data (e.g., based on sentence structure), tuple extraction can result in noisy tuples. To reduce the noisy tuples and resolve redundant and ambiguous facts, canonicalize the set of entities and relationships extracted from the unstructured data is canonicalized. For this, a two-pronged approach is utilized.

Taxonomy-Based Canonicalization. The entities (<subject> and <object>) and the relationship (<predicate> elements) included in each tuple are mapped to a predefined, known relationship taxonomy (e.g., the YAGO relationship taxonomy). For the entities, an edit distance is computed from the matching entities in the relationship taxonomy and the map beyond a threshold ($\sigma_{entity}$) is used as the canonicalized entity. Ontological constraints (such as same entities should have same type) also are incorporated to maintain consistency during canonicalization.

For the relationships, an ensemble of three techniques can be utilized to identify the appropriate relationship that can be mapped to a predefined relationship-taxonomy, constrained on the nature of entities associated with the tuples. These constraints incorporate the ontological knowledge of the relationships between entity types and relationships to remove noisy triples. For example, the domain and range constraints DOMAIN(isWrittenBy,book) and RANGE(isWrittenBy,person) specify that the relation 'isWrittenBy' is a mapping from entities with type book to entities with type person.

The first technique captures the semantic similarity of words in the phrase and the taxonomy-based relationships using a vector space model. It involves computing the cosine similarity between the Word2Vec embedding of the relationships from artifact tuples and those from the taxonomy. Word2Vec captures the semantic space of the words and therefore such a measure maps the relationships based on their semantic similarity to the relationships in the taxonomy.

The second technique is syntactic mapping. In this technique, the resemblance of two phrases is determined by the resemblance of the main verbs. To capture the syntax of the artifact description, a dependency parser is used and a network of "cognitive synonyms" of the root verb of the dependency tree is extracted. This network of synonyms is compared with the root verbs of the taxonomy relationships to establish correspondence between relationships in a syntactic sense.

The third technique is pattern-based mapping. In this technique, two verbal phrases are determined likely to be similar if they share some common pattern of words, with a possible difference of some words like helper verbs and adjectives. With this intuition this technique obtains textual patterns in binary relations and transforms them into syntactic-ontologic-lexical patterns using frequent item set mining and constructs a taxonomy for these patterns. This taxonomy is used to identify the closest matching relationship from the predefined taxonomy that corresponds to a current pattern tuple by checking whether the same pattern is contained in both of the relationships.

A voting from all three techniques discussed above is used to determine the best canonicalized relationship for the current tuple.

Clustering-Based Canonicalization. Since enterprise-specific data is expected to be unique, canonicalization based on a known, predefined taxonomy alone often does not suffice to clean up all the extracted tuples. To standardize new relationships that are not present in the predefined taxonomy, a relationship clustering step is performed to group similar phrases together and represent them with a single relationship. Cosine similarity between the Word2vec relationship vectors, as described above, is one similarity metric on which clustering may be performed. In implementations, a Density-based Spatial Clustering (DBSCAN) may be utilized since such clustering recognizes clusters of arbitrary size and does not require a predefined number of clusters as input. An additional constraint may be to maintain same NER tags of the <subject> and <object> elements throughout the cluster. In implementations, the clusters are further partitioned on the basis of the NER tags.

Figure 3:
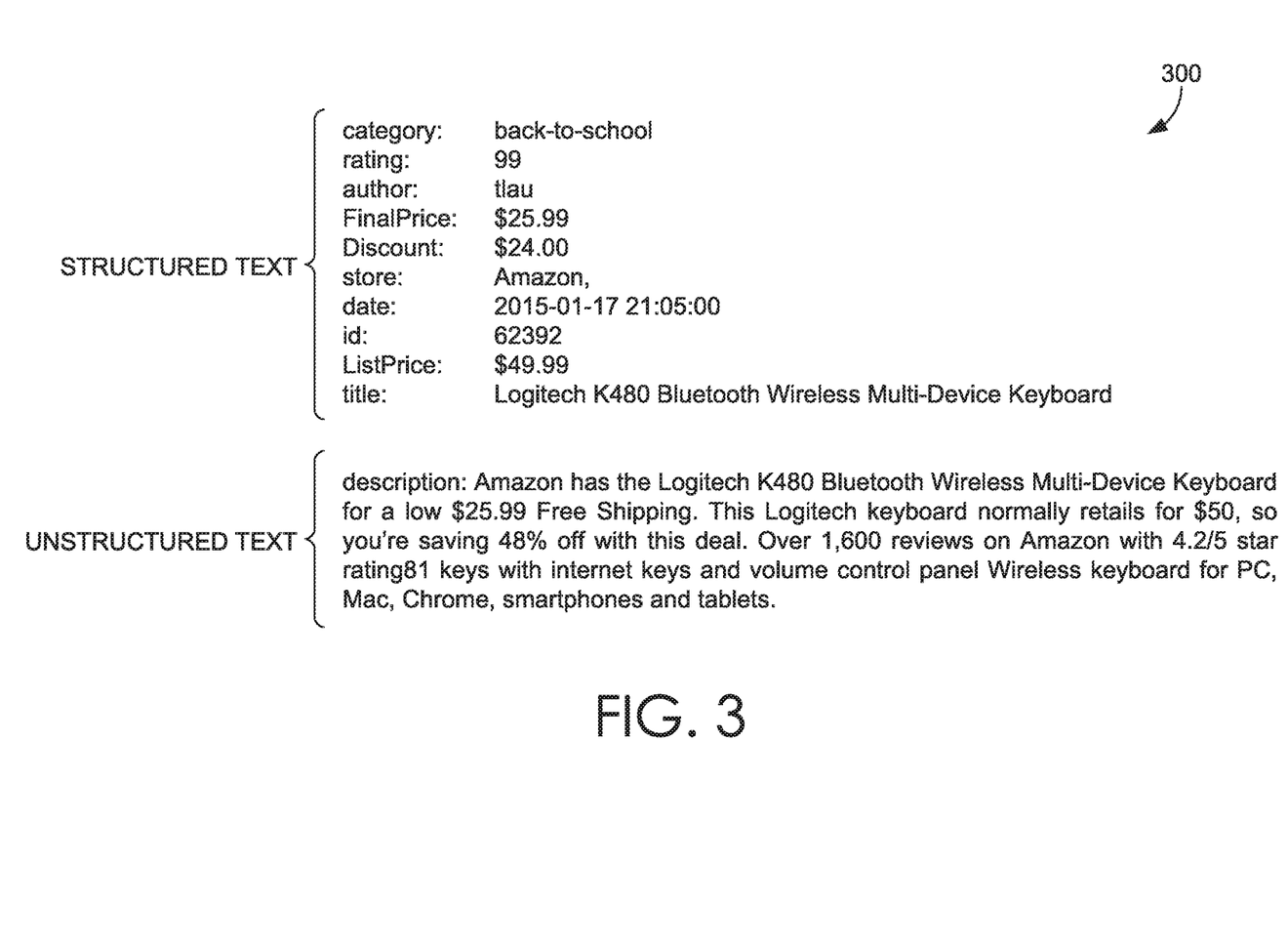
FIG. 3 is a schematic diagram of an exemplary clustering-based canonicalization, which may be employed in some implementations of the present disclosure.

From the obtained clusters, a candidate relationship may be selected based on the frequency of occurrence of the relationships appearing in the dataset to represent the cluster. With reference to FIG. 3, shown is an illustrative example of clustering stages. The relationships may be first clustered using DBSCAN which clusters them according to 'saving' or 'offering.' Then the clusters are further partitioned (if possible) with respect to the NER tags of the relationships. For example, the relationship 'typically charges' has an NER tag of 'Money' and 'is offering up to' has an NER tag of 'Percent." Thus, they may be partitioned. A candidate then may be chosen depending upon the criterion described above.

With reference back to FIG. 1, the knowledge graph constructing component 124 of the knowledge graph building infrastructure 112 is configured to construct a knowledge graph from, at least in part, the structured-data-tuples and their respective identified relationships, the unstructured-data-tuples that were able to be mapped to a predefined taxonomy and their respective identified relationships, and at least part of the unstructured-data-tuples and their respective assigned relationships.

Since the knowledge graph is constructed based on structured and unstructured data, it is subject to the Open World Assumption, which states that any missing tuple is not necessarily false, just unknown. Hence, to be complete, the knowledge graph is enriched with new tuples by inferring any missing tuples based on existing patterns. Thus, the knowledge graph enriching component 126 is configured to enrich constructed knowledge graphs. Enrichment addresses the following issues: extracting missing information, strengthening confidence value of correct facts, and resolving conflicts in the data.

The association rule mining is used to extract confident logical rules based on their support in the knowledge graph. Logical rules of the form, $$(E\_1-R\_1-E\_2) \wedge (E\_2-R\_2-E\_3) \wedge \ldots \wedge (E\_n-R\_n-E\_(n+1)) \Rightarrow (E\_1-R\_(n+1)-E\_(n+1))$$

encode frequent correlations in the data. The rules are assigned a normalized confidence that accounts for their frequency in the data. Building on these rules, a Probabilistic Soft Logic model may be utilized with a Markov Hinge-Loss function, which uses the input tuples and the weights of the derived rules to calculate the weights of inferred tuples. Furthermore, a higher confidence is assigned to facts supported by multiple rules, thereby reinforcing the correct tuples in the knowledge graph.

Figure 4:
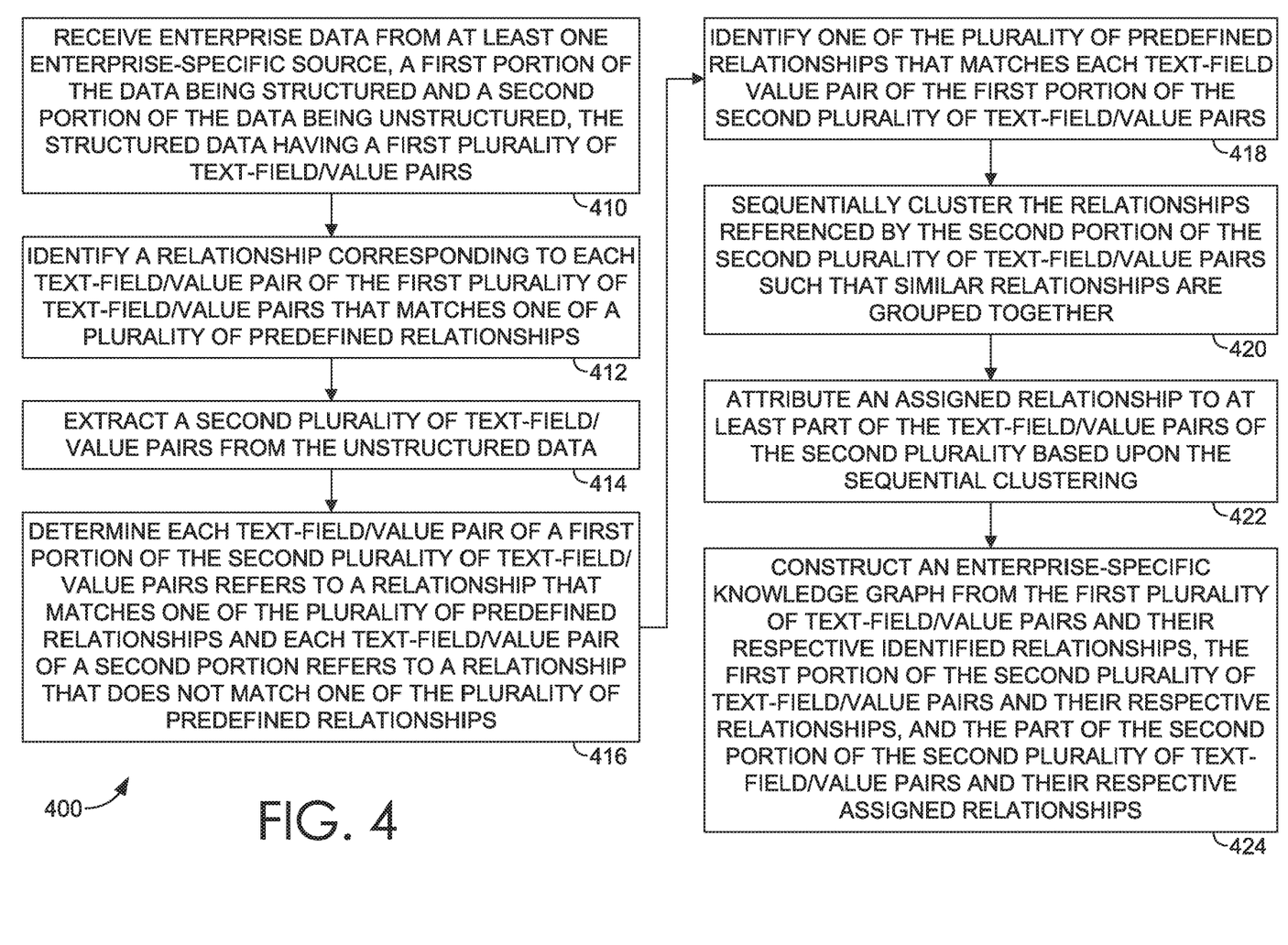
FIG. 4 is a flow diagram showing an exemplary method for constructing an enterprise-specific knowledge graph, in accordance with some implementations of the present disclosure.

Turning now to FIG. 4, illustrated is a schematic diagram showing an exemplary method 400 for constructing an enterprise-specific knowledge graph, in accordance with some implementations of the present disclosure. As indicated at block 410, enterprise data is received (for instance, by the data receiving component 116 of FIG. 1) from at least one enterprise-specific source (for instance, data store 118 of FIG. 1). A first portion of the enterprise data is structured data and a second portion of the enterprise data is unstructured data.

The structured data includes a plurality of text fields, each of the text fields having a corresponding value such that the structured data includes a first plurality of text-field/value pairs. As indicated at block 412, a relationship corresponding to each text-field/value pair of the first plurality of text-field/value pairs is identified (for instance, by the structured data processing component 120 of FIG. 1) that matches one of a plurality of predefined relationships included in a predefined relationship taxonomy.

As indicated at block 414, a second plurality of text-field/value pairs is extracted (e.g., by the unstructured data processing component 122 of FIG. 1) from the unstructured data. As indicated at block 416, it is determined (for instance, by the unstructured data processing component 122 of FIG. 1) that each text-field/value pair of a first portion of the second plurality of text-field/value pairs refers to a relationship that matches one of the plurality of predefined relationships included in the predefined relationship taxonomy. It is further determined that each text-field/value pair of a second portion of the second plurality of text-field/value pairs refers to a relationship that does not match one of the plurality of predefined relationships included in the predefined relationship taxonomy. As indicated at block 418, one of the plurality of predefined relationships included in the predefined relationship taxonomy is identified that matches each text-field/value pair of the first portion of the second plurality of text-field/value pairs. With respect to the second portion of the second plurality of text-field/value pairs, the relationships referenced thereby are sequentially clustered such that similar relationships are grouped together. This is indicated at block 420. As indicated at block 422, an assigned relationship is attributed to at least part of the text-field/value pairs of the second plurality of text-field/value pairs based upon the sequential clustering.

As indicated at block 424, the enterprise-specific knowledge graph is constructed (e.g., by the knowledge graph constructing component 124) from, at least in part, the first plurality of text-field/value pairs and their respective identified relationships, the first portion of the second plurality of text-field/value pairs and their respective identified relationships, and the part of the second portion of the second plurality of text-field/value pairs and their respective assigned relationships.

Figure 5:
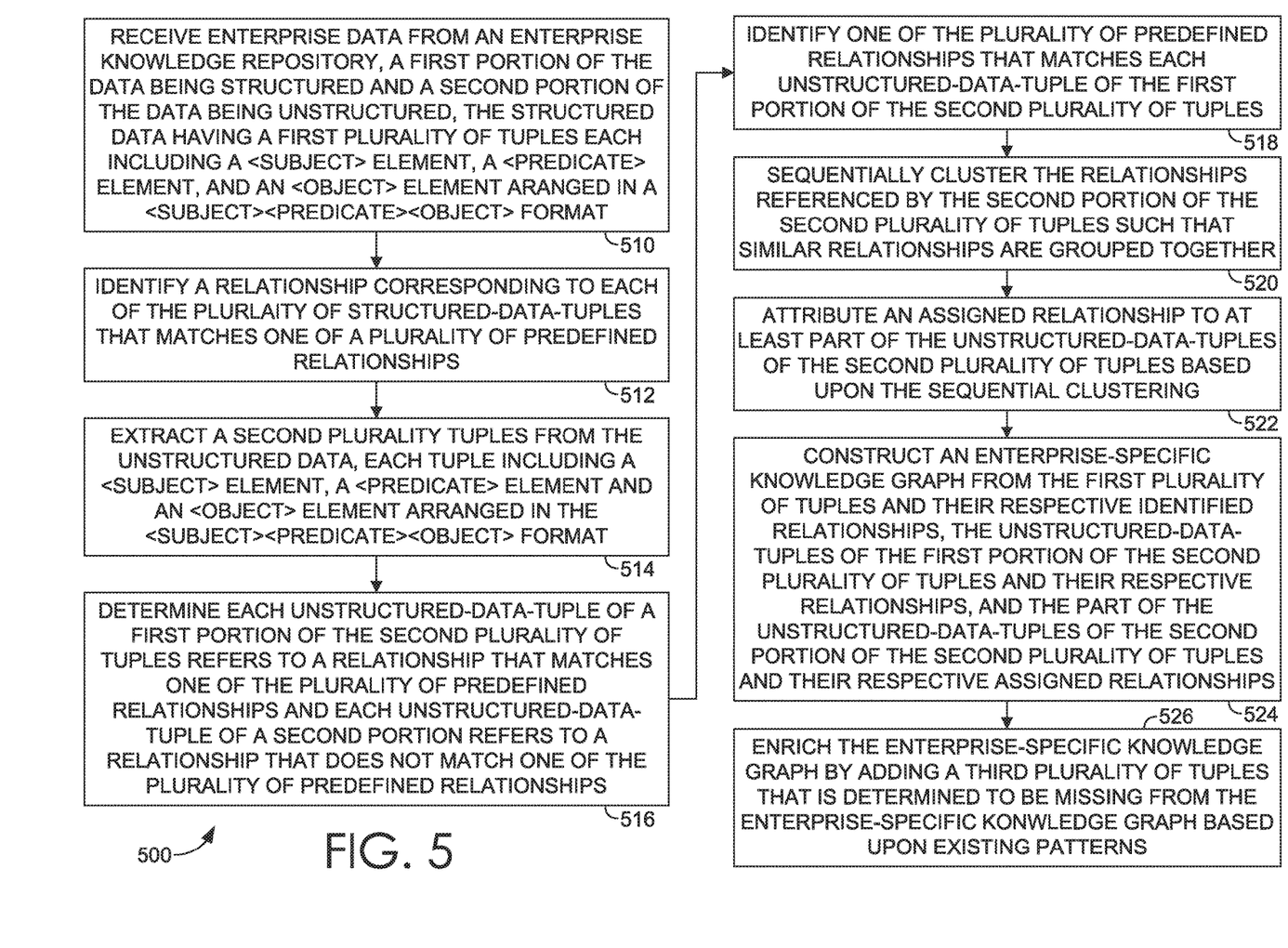
FIG. 5 is a flow diagram showing another exemplary method for constructing an enterprise-specific knowledge graph, in accordance with some implementations of the present disclosure.

Turning now to FIG. 5, illustrated is a schematic diagram showing an exemplary method 500 for constructing an enterprise-specific knowledge graph, in accordance with some implementations of the present disclosure. As indicated at block 510, enterprise data is received (for instance, by the data receiving component 116 of FIG. 1) from at least one enterprise knowledge repository (for instance, data store 118 of FIG. 1). A first portion of the enterprise data is structured data and a second portion of the enterprise data is unstructured data. The structured data includes a first plurality tuples, each of first plurality of tuples including a structured-data-tuple <subject> element, a structured-data-tuple <predicate> element, and a structured-data-tuple <object> element arranged in a <subject><predicate><object> format. As indicated at block 512, a relationship corresponding to each of the plurality of structured-data-tuples is identified (e.g., utilizing the structured data processing component 120) that matches one of a plurality of predefined relationships included in a predefined relationship taxonomy.

As indicated at block 514, a second plurality of tuples is extracted from the unstructured data (for instance, by the unstructured data processing component 122 of FIG. 1). Each of the second plurality of tuples includes an unstructured-data-tuple <subject> element, an unstructured-data-tuple <predicate> element, and an unstructured-data-tuple <object> element arranged in the <subject><predicate><object> format.

As indicated at block 516, it is determined (e.g., by the unstructured data processing component 122 of FIG. 1) that each unstructured-data-tuple of a first portion of the second plurality of tuples refers to a relationship that matches one of the plurality of predefined relationships included in the predefined relationship taxonomy and each unstructured-data-tuple of a second portion of the second plurality of tuples refers to a relationship that does not match one of the plurality of predefined relationships included in the predefined relationship taxonomy. As indicated at block 518, one of the plurality of predefined relationships included in the predefined relationship taxonomy is identified that matches each unstructured-data-tuple of the first portion of the second plurality of tuples. As indicated at block 520, the relationships referenced by the second portion of the second plurality of tuples are sequentially clustered such that similar relationships are grouped together and, as indicated at block 522, an assigned relationship is attributed to at least part of the unstructured-data-tuples of the second plurality of tuples based upon the sequential clustering.

As indicated at block 524, an enterprise-specific knowledge graph is constructed (e.g., by the knowledge graph constructing component 124 of FIG. 1) from, at least in part, the structured-data-tuples of the first plurality of tuples and their respective identified relationships, the unstructured-data-tuples of the first portion of the second plurality of tuples and their respective identified relationships, and at least part of the unstructured-data-tuples of the second portion of the second plurality of tuples and their respective assigned relationships. As indicated at block 526, the enterprise-specific knowledge graph is enriched (e.g., by the knowledge graph enriching component 126 of FIG. 1) by adding a third plurality of tuples that is determined to be missing from the enterprise-specific knowledge graph based upon existing patterns.

Figure 6:
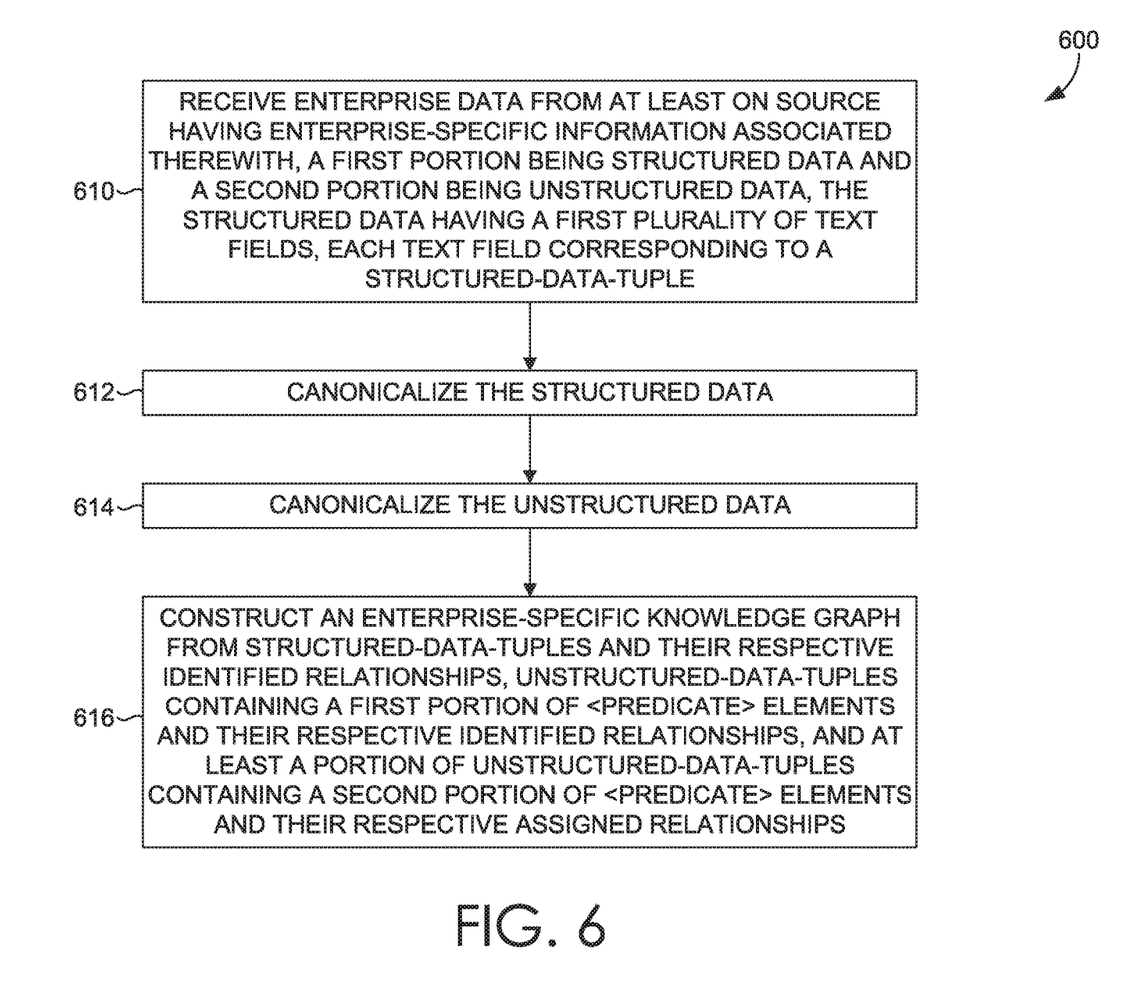
FIG. 6 is a flow diagram showing yet another exemplary method for constructing an enterprise-specific knowledge graph, in accordance with some implementations of the present disclosure.

With reference to FIG. 6, yet another exemplary method 600 is illustrated for constructing an enterprise specific knowledge graph in accordance with implementations of the present disclosure. As indicated at block 610, enterprise data is received (e.g., by the data receiving component 116 of FIG. 1) from at least one source (e.g., data store 118 of FIG. 1) having enterprise-specific information associated therewith. A first portion of the received enterprise data is structured data and a second portion of the received enterprise data is unstructured data.

The structured data includes a first plurality of text fields, each text field corresponding to a structured-data-tuple. As indicated at block 612, the structured data is canonicalized (for instance, by the structured data processing component 120 of FIG. 1) by: (1) identifying a relationship corresponding to each structured-data-tuple; and (2) mapping the relationship to a relationship included in a predefined relationship taxonomy.

As indicated at block 614, the unstructured data is canonicalized (e.g., by the unstructured data processing component 122 of FIG. 1) by: (1) extracting a plurality of unstructured-data-tuples from the unstructured data, each of the unstructured-data-tuples having a <subject> element, a <predicate> element and an <object> element, the <subject> and <object> elements representing entities and the <predicate> element representing a correlation between the <subject> and <object> elements; (2) mapping the <subject> and <object> elements of each unstructured-data-tuple to entity categories included in a predefined entity taxonomy; (3) determining a first portion of the <predicate> elements that can be mapped to the predefined relationship taxonomy and a second portion of the <predicate> element that cannot be mapped to the predefined relationship taxonomy; (4) mapping each <predicate> element of the first portion of the <predicate> elements to a relationship included in the predefined relationship taxonomy; (5) sequentially clustering the second portion of the <predicate> elements to group similar <predicate> elements together; and (6) attributing an assigned relationship to at least part of the second portion of the <predicate> elements based on the sequential clustering.

As indicated at block 616, an enterprise-specific knowledge graph is constructed (e.g., utilizing the knowledge graph constructing component 124 of FIG. 1) from, at least in part, the structured-data-tuples and their respective identified relationships, the unstructured-data-tuples containing the first portion of the <predicate> elements and their respective identified relationships, and at least a portion of the unstructured-data-tuples containing the second portion of the <predicate> elements and their respective assigned relationships.

Having briefly described an overview of embodiments of the present invention, an exemplary operating environment in which at least exemplary embodiments may be implemented is described below in order to provide a general context for various aspects of the present invention. Referring to the figures in general and initially to FIG. 7 in particular, an exemplary operating environment for implementing embodiments of the described technology is shown and designated generally as computing device 700. The computing device 700 is but one example of a suitable computing environment and is not intended to suggest any limitation as to the scope of use or functionality of embodiments hereof. Neither should the computing device 100 be interpreted as having any dependency or requirement relating to any one component nor any combination of components illustrated.

The invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. The invention may be practiced in a variety of system configurations, including, but not limited to, hand-held devices, consumer electronics, general-purpose computers, more specialty computing devices, and the like. The invention also may be practiced in distributed computing environments where tasks are performed by remote-processing devices that are linked through a communications network.

Figure 7:
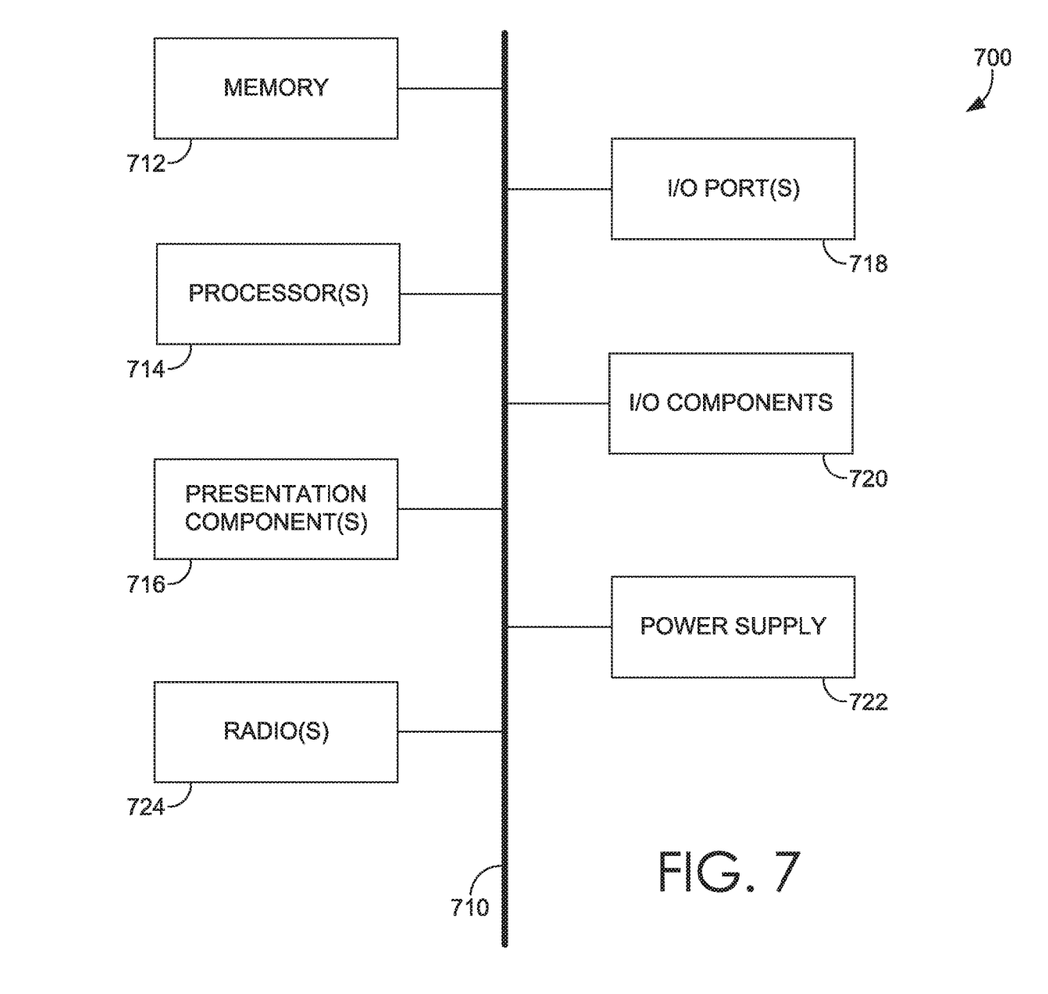
FIG. 7 is a block diagram of an exemplary computing environment suitable for use in accordance with some implementations of the present disclosure.

With continued reference to FIG. 7, the computing device 700 includes a bus 710 that directly or indirectly couples the following devices: a memory 712, one or more processors 714, one or more presentation components 716, one or more input/output (I/O) ports 718, one or more I/O components 720, and an illustrative power supply 722. The bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 7 is merely illustrative of an exemplary computing device that can be used in connection with one or more exemplary embodiments of the present invention. Distinction is not made between such categories as "workstation," "server," "laptop," "hand-held device," etc., as all are contemplated within the scope of FIG. 7 and reference to "computing device."

The computing device 700 typically includes a variety of computer-readable media. Computer-readable media may be any available media that is accessible by the computing device 700 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 700. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 712 includes computer-storage media in the form of volatile and/or nonvolatile memory. The memory may be removable, non-removable, or a combination thereof. Exemplary hardware devices include solid-state memory, hard drives, optical-disc drives, and the like. The computing device 700 includes one or more processors that read data from various entities such as the memory 712 or the I/O components 720. The presentation component(s) 716 present data indications to a user or other device. Exemplary presentation components include a display device, speaker, printing component, vibrating component, and the like.

The I/O ports 718 allow the computing device 700 to be logically coupled to other devices including the I/O components 720, some of which may be built in. Illustrative I/O components include a microphone, joystick, game pad, satellite dish, scanner, printer, wireless device, a controller, such as a stylus, a keyboard and a mouse, a natural user interface (NUI), hard/soft button, touch screen display, and the like.

A NUI processes air gestures (i.e., gestures made in the air by one or more parts of a user's body or a device controlled by a user's body), voice, or other physiological inputs generated by a user. These inputs may be interpreted as product package creation requests, generic product package selections, download requests and the like presented by the computing device 700. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion. The output of the accelerometers or gyroscopes is provided to the display of the computing device 700 to render immersive augmented reality or virtual reality.

As can be understood, aspects of the present invention provide systems, methods, and computer storage media for constructing enterprise-specific knowledge bases from enterprise-specific data that includes structured and unstructured data. Relationships between entities that match relationships in a known relationship taxonomy are identified for each of a plurality of tuples included in the structured data. Where possible, relationships between entities that match relationships in a known relationship taxonomy also are identified for tuples included in the unstructured data. If relationships between entities that match relationships in a known relationship taxonomy cannot be identified for tuples in the unstructured data, extracted relationships are sequentially clustered with similar relationships in other unstructured tuples and a relationship is assigned to the clustered tuples. An enterprise-specific knowledge graph is constructed from the structured-data-tuples and their respective identified relationships, the unstructured-data-tuples where the relationships could be mapped to a relationship from a known relationship taxonomy and their respective identified relationships, and the unstructured-data-tuples that could not be mapped to a relationship from a known relationship taxonomy and their respective assigned relationships. The knowledge graph is enriched with any information determined to be missing therefrom using a probabilistic approach.

Some specific embodiments of the invention have been described, which are intended in all respects to be illustrative rather than restrictive. Alternative embodiments will become apparent to those of ordinary skill in the art to which the present invention pertains without departing from its scope.

Certain illustrated embodiments hereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 400 of FIG. 4, 500 of FIG. 5, and 600 of FIG. 6 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. A computer-implemented method for constructing a knowledge graph, the method comprising:
   receiving data, a first portion of the data being structured data and a second portion of the data being unstructured data, the structured data having a plurality of text fields, each of the plurality of text fields having a corresponding value such that the structured data includes a plurality of text-field/value pairs;
   generating a first plurality of tuples based on the plurality of text-field/value pairs from the structured data, each tuple from the first plurality of tuples including a relationship corresponding to each text-field/value pair identified as matching one of a plurality of predefined relationships included in a predefined relationship taxonomy;
   generating a second plurality of tuples based on a first plurality of relationships extracted from the unstructured data and identified as matching one of the plurality of predefined relationships included in the predefined relationship taxonomy;
   generating a third plurality of tuples based on a second plurality of relationships extracted from the unstructured data and identified by:
      clustering relationships from the second plurality of relationships such that similar relationships are grouped together; and
      attributing an assigned relationship to at least part of the tuples from the third plurality of tuples based upon the clustering; and
   constructing the knowledge graph from, at least in part, the first plurality of tuples, the second plurality of tuples, and the third plurality of tuples.

2. The computer-implemented method of claim 1, further comprising enriching the knowledge graph by adding a fourth plurality of tuples that is determined to be missing based upon existing patterns.

3. The computer-implemented method of claim 1, wherein each tuple of the first plurality of tuples has a <subject> element, a <predicate> element, and an <object> element arranged in a <subject><predicate><object> format.

4. The computer-implemented method of claim 3, wherein within a given tuple, the <subject> element and the <object> element refer to entities and the <predicate> element refers to a correlation between the entities referred to by the <subject> and <object> elements.

5. The computer-implemented method of claim 4, wherein the relationship corresponding to each text-field/value pair of the first plurality of text-field/value pairs of the structured data is identified based on a particular predefined relationship of the plurality of predefined relationships included in the predefined relationship taxonomy that matches the <predicate> element of each tuple from the first plurality of tuples.

6. The computer-implemented method of claim 1, wherein each tuple of the second plurality of tuples and the third plurality of tuples has a <subject> element, a <predicate> element, and an <object> element arranged in a <subject><predicate><object> format.

7. The computer-implemented method of claim 6, wherein within a tuple, the <subject> element and the <object> element refer to entities and the <predicate> element refers to a correlation between the entities referred to by the <subject> and <object> elements.

8. The computer-implemented method of claim 7, wherein the relationship corresponding to each tuple from the second plurality of tuples extracted from the unstructured data is identified based on a particular predefined relationship of the plurality of predefined relationships included in the predefined relationship taxonomy that matches the <predicate> element of each tuple from the second plurality of tuples.

9. The computer-implemented method of claim 1, wherein the one of the plurality of predefined relationships included in the predefined relationship taxonomy that matches each s relationship from the first plurality of relationships extracted from the unstructured data is identified utilizing one or more of semantic mapping, syntactic mapping, and pattern-based mapping.

10. One or more computer storage media storing computer-useable instructions that, when executed by one or more processors, cause the one or more processors to perform a method for constructing a knowledge graph, the method comprising:

receiving data from a repository, a first portion of the data being structured data and a second portion of the data being unstructured data;

generating a plurality of structured-data tuples from the structured data, each structured-data tuple including a structured-data-tuple <subject> element, a structured-data-tuple <predicate> element, and a structured-data-tuple <object> element arranged in a <subject><predicate><object> format;

identifying a relationship corresponding to each of the plurality of structured-data tuples that matches one of a plurality of predefined relationships included in a predefined relationship taxonomy;

extracting a plurality of unstructured-data tuples from the unstructured data, each unstructured-data tuple including an unstructured-data-tuple <subject> element, an unstructured-data-tuple <predicate> element, and an unstructured-data-tuple <object> element arranged in the <subject><predicate><object> format;

determining that each unstructured-data tuple of a first portion of the plurality of unstructured-data tuples refers to a relationship that matches one of the plurality of predefined relationships included in the predefined relationship taxonomy and each unstructured-data tuple of a second portion of the plurality of unstructured-data tuples refers to a relationship that does not match one of the plurality of predefined relationships included in the predefined relationship taxonomy;

identifying one of the plurality of predefined relationships included in the predefined relationship taxonomy that matches each unstructured-data tuple of the first portion of the plurality of unstructured-data tuples;

clustering the relationships referenced by the second portion of the plurality of unstructured-data tuples such that similar relationships are grouped together;

attributing an assigned relationship to at least part of the unstructured-data tuples of the second portion of the plurality of unstructured-data tuples based upon the clustering;

constructing the knowledge graph from, at least in part, the structured-data tuples of the plurality of structured-data tuples and their respective identified relationships, the unstructured-data tuples of the first portion of the plurality of unstructured-data tuples and their respective identified relationships, and at least part of the unstructured-data tuples of the second portion of the plurality of unstructured-data tuples and their respective assigned relationships; and enriching the knowledge graph by adding a plurality of tuples that is determined to be missing from the knowledge graph based upon existing patterns.

11. The one or more computer storage media of claim 10, wherein within a given structured-data tuple, the structured-data-tuple <subject> element and the structured-data-tuple <object> element refer to entities and the structured-data-tuple <predicate> element refers to a correlation between the entities referred to by the structured-data-tuple <subject> and <object> elements.

12. The one or more computer storage media of claim 11, wherein identifying the relationship corresponding to each of the plurality of structured-data tuples that matches one of the plurality of predefined relationships included in the predefined relationship taxonomy comprises identifying a particular predefined relationship of the plurality of predefined relationships included in the predefined relationship taxonomy that matches the structured-data-tuple <predicate> element of each structured-data tuple.

13. The one or more computer storage media of claim 10, wherein within a given unstructured-data tuple, the unstructured-data-tuple <subject> element and the unstructured-data-tuple <object> element refer to entities and the unstructured-data-tuple <predicate> element refers to a correlation between the entities referred to by the unstructured-data-tuple <subject> and <object> elements.

14. The one or more computer storage media of claim 13, wherein identifying the one of the plurality of predefined relationships included in the predefined relationship taxonomy that matches each unstructured-data tuple of the first portion of the plurality of unstructured-data tuples comprises identifying a particular predefined relationship of the plurality of predefined relationships included in the predefined relationship taxonomy that matches the <predicate> element of each unstructured-data tuple.

15. The computer-implemented method of claim 10, wherein identifying one of the plurality of predefined relationships included in the predefined relationship taxonomy that matches each unstructured-data tuple of the first portion of the plurality of unstructured-data tuples comprises identifying the one of the plurality of predefined relationships utilizing one or more of semantic mapping, syntactic mapping, and pattern-based mapping.

16. A computer system comprising:

one or more processors; and one or more computer storage media storing computer-useable instructions that, when used by one or more processors, cause the one or more processors to:

receive data from at least one source, a first portion of the received data being structured data and a second portion of the received data being unstructured data;

canonicalize the structured data by:
extracting a plurality of structured-data tuples from the structured data, each tuple including a relationship; and
mapping the relationship of each structured-data tuple to a predefined relationship included in a predefined relationship taxonomy;

canonicalize the unstructured data by:
extracting a plurality of unstructured-data tuples from the unstructured data, each of the plurality of unstructured-data tuples having a <subject> element, a <predicate> element and an <object> element, the <subject> and <object> elements representing entities and the <predicate> element representing a correlation between the <subject> and <object> elements;
mapping the <subject> and <object> elements of each unstructured-data tuple to entity categories included in a predefined entity taxonomy;
determining a first portion of the <predicate> elements that can be mapped to a predefined relationship in the predefined relationship taxonomy and a second portion of the <predicate> element that cannot be mapped to a predefined relationship in the predefined relationship taxonomy;
mapping each <predicate> element of the first portion of the <predicate> elements to a predefined relationship included in the predefined relationship taxonomy;

clustering the second portion of the <predicate> elements to group similar <predicate> elements together; and attributing an assigned relationship to at least part of the second portion of the <predicate> elements based on the clustering; and construct a knowledge graph from, at least in part, the structured-data tuples and their respective identified predefined relationships, the unstructured-data tuples containing the first portion of the <predicate> elements and their respective identified predefined relationships, and at least a portion of the unstructured-data tuples containing the second portion of the <predicate> elements and their respective assigned relationships.

17. The computer system of claim 16, wherein the one or more computer storage media further cause the one or more processors to enrich the knowledge graph by adding a plurality of additional tuples determined to be missing from the knowledge graph based upon existing patterns.

18. The computer system of claim 16, wherein each structured-data tuple includes a <subject> element, a <predicate> element, and an <object> element, and wherein the relationship identified as corresponding to each structured-data tuple is referred to by the <predicate> element.

19. The computer system of claim 16, wherein mapping each <predicate> element of the first portion of the <predicate> elements to a predefined relationship included in the predefined relationship taxonomy comprises mapping each <predicate> element of the first portion of the <predicate> elements to a predefined relationship included in the predefined relationship taxonomy utilizing one or more of semantic mapping, syntactic mapping.

20. The computer system of claim 16, wherein attributing an assigned relationship to at least part of the second portion of the <predicate> elements based on the clustering comprises attributing an assigned relationship to at least part of the second portion of the <predicate> elements utilizing one or more voting methods.

* * * * *

UNITED STATES PATENT AND TRADEMARK OFFICE
CERTIFICATE OF CORRECTION

PATENT NO. : 10,915,577 B2
APPLICATION NO. : 15/928288
DATED : February 9, 2021
INVENTOR(S) : Balaji Vasan Srinivasan et al.

It is certified that error appears in the above-identified patent and that said Letters Patent is hereby corrected as shown below:

In the Drawings

In sheet 5 of 7, FIG. 5, reference numeral 510, Line 7, delete "ARANGED" and insert -- ARRANGED --, therefor.

In sheet 5 of 7, FIG. 5, reference numeral 512, Line 2, delete "PLURLAITY" and insert -- PLURALITY --, therefor.

In sheet 5 of 7, FIG. 5, reference numeral 526, Line 4, delete "KONWLEDGE" and insert -- KNOWLEDGE --, therefor.

In the Specification

In Column 5, Line 24, after "plurality" insert -- of --.

In Column 11, Lines 44-45, after "plurality" insert -- of --.

In the Claims

In Column 16, Line 64, Claim 9, after "each" delete "s".

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*